United States Patent Office 2,824,114
Patented Feb. 18, 1958

2,824,114

WATER SOLUBLE GROUP IV-A METAL ESTERS OF AMINO ALCOHOLS AND THEIR PREPARATION

Charles O. Bostwick, Stanton, Del., assignor to E. I. du Pont de Nemours and Company, Wilmington, Del., a corporation of Delaware No Drawing. Application September 9, 1952
Serial No. 308,720

20 Claims. (Cl. 260—429.3)

This invention relates to new organic compounds and to novel methods for effecting their preparation. More specifically, it relates to new group IV-A metal esters of amino alcohols and their modified derivatives.

It is among the objects of this invention to provide new water-stable organic compounds of metals from group IV-A of the periodic table. A further, particular object is the preparation of new organic compounds of titanium and zirconium which are useful as a surface-active agent for pigments, hydrocarbons, waxes and the like, in aqueous and organic solvent systems. Other objects and advantages of the invention will become apparent from the ensuing description.

These and other objects are attained in my invention which comprises reacting a titanium or other group IV-A metal ester with an amino alcohol compound.

In a more specific and preferred embodiment, the invention comprises reacting an alkyl titanium or zirconium ester with an amino alcohol such as triethanolamine and thereafter separating and recovering the desired water-stable organic compound.

In accordance with one particular and preferred adaptation of my invention, a titanium ester, such as tetraisopropyl titanate, is reacted with an amino alcohol, such as triethanolamine, by mixing the two reactants in the mol ratio desired in a suitable reaction vessel. The latter can be equipped with conventional agitation means for the reactants and an associated reflux condenser and distillation head. On mixing, exothermic heat of reaction and chelation is evolved, the reaction being immediately completed, normally within a short period of time, e. g., within a few seconds or a very few minutes. To remove the isopropyl alcohol by-product by distillation, the temperature can be raised to 150–180° C. If desired, however, the reaction by-product alcohol can be left in the product mixture as a suitable solvent therefor and without detriment to the resultant finished product. Purification by distillation must be undertaken with care due to the high boiling points and limited heat stability of the products obtained from my process.

As noted, the reaction takes place immediately on reactant mixing with the evolution of heat. In the reaction, according to the molar ratio of amino alcohol to titanium ester used, alcohol groups from the titanium ester are replaced by one or more amino alcohol groups. A chelation reaction between the nitrogen or unreacted hydroxyl of the amino alcohol and the unsatisfied coordinate valences of the titanium in the same molecule also takes place, making a chelation complex which is usually stable in water. Polymeric crosslinking between molecules can also occur. Furthermore, this completed or partly completed coordinate structure usually cannot further ester interchange or does so very slowly due to the relative stability of the chelates. The water stability of chelated amino alcohol titanate can be further improved, for example, by suitable acid modification of the residual amino nitrogen base function with an acid, in which form it is usually best suited for use as a dispersing agent.

The new organo-metal compounds of this invention vary in physical form from liquids to hard glass-like solids, either clear or white. They generally are stable to water, are usually soluble without gellation, and generally are soluble or partly soluble in certain organic liquids such as benzene, xylene, or alcohols. Their water solutions are generally high in pH, and can be neutralized to a lower pH with acids to increase water stability. They are especially useful as dispersing agents and surface active agents for hydrocarbons and waxes in various media.

To a clearer understanding of the invention, the following specific examples are given. These are merely illustrative and are not to be construed as limiting the invention:

EXAMPLE I

A series of amino alcohol titanates was prepared by reacting in a reaction vessel equipped with a stirrer and an associated reflux condenser triethanolamine with tetraisopropyl titanate at various molar ratios ranging from 4:1 to 1:1 with the results shown in Table I below. After the initial heat of reaction, the temperature of the reaction mass was raised to 160° C. to remove by distillation by-product isopropyl alcohol formed. As will be observed, liquid reaction products were obtained at the higher mole ratios and solid products were obtained at the lower ratios, and all were soluble in water.

Table I

| Mol Ratio of Reactants, amino alcohol/titanium ester | Properties of Reaction Product |
|---|---|
| 4/1 | Viscous liquid sol. in water. pH=9.7. |
| 3/1 | Viscous liquid sol. in water. Ti analysis: found 9.8%, theory 9.75%. |
| 2/1 | Glass-like solid sol. in water; 30% soln. gelled after 7 days; insol. hydrocarbons; pH 9.3. Ti analysis: found 14.1%, theory 14.0. |
| 1/1 | Brittle solid sol. in water—30% sol. gelled on heating; sl. sol. gasoline; pH 9.1. |

One mol of 2:1 triethanolamine titanate reaction product was neutralized to 8.0 pH by the addition of a 70% solution of glycollic acid. The stable acid modified product so formed was found to be useful, particularly in small amounts, as a dispersing agent for pigments, such as titanium dioxide, zinc sulfide, lithopone, and the like. A similar acid modification of the same amino alcohol titanium ester using stearic acid gave a clear solution which emulsified in water, and was soluble in benzene, and partly soluble in acetone. This product was particularly useful in producing wax emulsions for paper coatings to form a clear, transparent waxed paper.

EXAMPLE II 4 mols of diethanol amine were reacted with 1 mol of tetraisopropyl titanate in a closed reaction flask. On mixing the reactants, heat was evolved. By-product isopropyl alcohol was removed, up to a temperature of 180° C., from the reaction products to give a viscous liquid amino alcohol titanate product which was soluble in water and slightly soluble in xylene.

EXAMPLE III 4 mols of 2-amino-2-methyl-1-propanol were mixed with 1 mol of tetraisopropyl titanate in a reaction flask equipped with reflux and distillation heads. After initial heat of reaction, external heat was added to remove reaction by-product alcohol, to a temperature of 190° C. The reaction product comprised a white solid, soluble in water. Atmospheric pressure distillation of the product resulted in a white solid distillate containing 20.5% $TiO_2$ and 9.8% N. It was also soluble in water and did not melt at 230° C.

EXAMPLE IV

Employing an apparatus of the type referred to in Example III, 2 mols of triethanolamine were reacted with 1 mol of tetrabutyl zirconate dissolved in butanol in the reaction vessel. Exothermic heat was evolved on mixing. Additional heat was added and butanol solvent and by-product removed to 160° C. The polymeric amino alcohol zirconate product when cooled was a white solid, soluble in water.

Examples of other types of amino alcohol titanates prepared by reacting various amino alcohols with tetra-isopropyl titanate comprise those shown in Table II below. These products were prepared by mixing the reactants in the mol ratio shown, allowing the exothermic heat of reaction to subside, and then heating to remove by-product alcohol from the titanium ester, at 155–195° C. unless otherwise noted.

Table II

| Mol Ratio, Amino Alcohol/ Titanium Ester | Amino Alcohol Reactant | Properties |
| --- | --- | --- |
| 2/1 | N-Butyl diethanolamine. | Viscous liquid—Insol. water, acetone. Soya acids modification—sol. in acetone. |
| 4/1 | N-dimethyl amino ethanol. | Liquid—gelled in water. Glycollic acid modification—sol. in water. |
| 2/1 | N—diethyl amino ethanol. | Liquid—sol. in water. Insol. 1 mol stearic acid, to give liquid; sol. in benzene, insol. acetone, sol. in water. |
| 2/1 | 2-amino-2-methyl-1,3 propanediol. | (Alcohol partly removed) viscous liquid—sol. in benzene. |
| 1/1 | 2-amino-2-methyl 1,3 propanediol. | 80° C. max. temp. Hard, white, brittle, solid—m. p. 215-218° C. |
| 4/1 | N-Acetyl ethanolamine. | Viscous liquid—sol. in water, gelled after 2 days. 2 mols glycollic acid gave water sol. solution. |
| 2/1 | Dihydroxy-ethyl ethylene diamine. | Viscous liquid—sol. in benzene. Insol. in water, acetone. |
| 4/1 | Ethanolamine | Viscous liquid—slowly crystallized. |
| 4/1 | N-diethylamino-propyl alcohol. | Insol. in water. Sol. in xylene. |
| 2/1 | N-Di-2-ethyl-hexyl ethanolamine. | Viscous liquid—Sol. in benzene. Insol. water, acetone. |
| 2/1/1: | | |
| (2 mols) | 2-amino-2-methyl-1-propanol. | Dark viscous liquid—sol. in water. |
| (1 mol) | Dihydroxy-ethyl ethylene diamine. | |

As indicated above, absolute identification of the compounds produced herein is difficult because of the polymeric nature of the products. This polymerization is associated with the chelation which takes place with the unreacted coordinated bonds of the titanium or other metal atom. A study of the heats involved in this type of reaction has shown a definite heat of chelation for alcohols and amino alcohols, and this data is of value in following the reactions of this type. Such a study with alcohols alone produced heat data as follows: The heat of chelation for 2-ethylhexanediol-1,3 with tetraisopropyl titanate has been measured as being of the order of 17 K. cal./mol of tetraisopropyl titanate while the heat for simple complexing for n-butanol and ethanol is of the order of 8–9.K. cal./mol. of tetraisopropyl titanate. Two amino alcohols, triethanol amine and 2-amino butanol, gave essentially the same value which is almost identical with that obtained for 4-ethyl-hexanediol-1,3. The only characteristic they have in common is their ability to chelate with titanium, and it would be highly coincidental if any other reaction caused three such widely different types of compounds to give such similar values.

Similar chelated complexes can be obtained by reacting amino alcohols with esters of other group IV-A metals or mixtures thereof which form ortho esters or condensed ortho esters and have up to four unsatisfied coordinate bonds. Titanium and zirconium are particularly preferred for use. Examples of other useful metals include hafnium and thorium.

As already indicated, a wide variety of amino alcohols or mixtures thereof can be used in the invention. In general, these comprise the primary, secondary and tertiary amino alcohols and mono-, di- and triamino alcohols. In addition to the types already mentioned, various aromatic forms such as amino phenols, amino catechols, amino resorcinols, amino hydroquinones, amino cresols, amino pyrogallols, amino naphthols, amino anthranols, etc., can be used. Specific examples thereof include o-amino phenol, 3-amino catechols, 1-hydroxy B-naphthylamine, 1:3 dihydroxy, 2-amino benzene, 2:4 dihydroxy aniline, etc.

Organic esters utilizable for obtaining the chelated amino alcohol esters of the contemplated group IV-A metals comprises the ortho esters and condensed ortho esters of such metals. They correspond to the formula $Me(OR)_4$ wherein Me consists of a metal of the type above mentioned, and R is an organic radical, e. g., alkyl, cycloalkyl, aryl, or aralkyl. Particularly useful and preferred forms of metal esters comprise titanates and zirconates corresponding to the formula $Ti(OR)_4$ and $Zr(OR)_4$, respectively, in which R is an alkyl hydrocarbon radical (methyl, ethyl, propyl, butyl, etc.) of an alcohol containing from 1–12 carbon atoms. Specific examples of such particularly useful esters include methyl, ethyl, isopropyl, butyl, amyl, octyl, dodecyl, etc., as well as 2-ethyl hexyl, benzyl, cyclo hexyl, phenyl, and beta naphthyl orthotitanates and zirconates.

If desired, and to facilitate the reaction where the ester used comprises a normally solid or viscous material, use of an inert organic solvent such as benzene, toluene, xylene, cyclohexane, or the like, can be resorted to. Similarly, in effecting the reaction, recourse can be had to any desired temperature ranging, say, from about 50° C. to 225° C., and depending upon the nature and type of amino alcohol and metal ester reactants as well as the group IV-A metal ester of amino alcohol reaction product which is desired.

The acid modification of the residual amino nitrogen base function of the amino alcohol esters can be carried out in any aqueous, alcoholic or other suitable solution, or in the pure state. Any inorganic or organic acid can be used, including carbonic acid, phosphoric acid, sulfamic acid, boric acid, formic acid, acetic acid, glycollic acid, gluconic acid, linseed oil acids, oleic acid, coconut oil acids, lauric acid, castor oil acids, stearic acid, and rosin, etc. The acid modification should be carried out so that the product when placed in water will exhibit a pH lower than the original amino alcohol titanium or other metal ester and preferably is in the range of about 5–9 pH.

I claim as my invention:

1. A water soluble group IV-A metal ester of an amino hydroxy compound selected from the group consisting of a beta amino alcohol, a gamma amino alcohol, and an ortho amino phenol.

2. A water soluble polymeric group IV-A metal ester of an amino hydroxy compound selected from the group consisting of a beta amino alcohol, a gamma amino alcohol, and an ortho amino phenol.

3. A water soluble titanium ester of an amino hydroxy compound selected from the group consisting of a beta amino alcohol, a gamma amino alcohol, and an ortho amino phenol.

4. A water soluble zirconium ester of an amino hydroxy compound selected from the group consisting of a beta amino alcohol, a gamma amino alcohol, and an ortho amino phenol.

5. A water soluble polymeric titanium ester of an amino hydroxy compound selected from the group consisting of a beta amino alcohol, a gamma amino alcohol, and an ortho amino phenol.

6. A water soluble polymeric zirconium ester of an amino hydroxy compound selected from the group consisting of a beta amino alcohol, a gamma amino alcohol, and an ortho amino phenol.

7. An acid-modified, water soluble group IV-A metal ester of an amino hydroxy compound selected from the group consisting of a beta amino alcohol, a gamma amino alcohol, and an ortho amino phenol, said ester having a 5-9 pH in an aqueous solution.

8. An acid-modified, water soluble polymeric group IV-A metal ester of an amino hydroxy compound selected from the group consisting of a beta amino alcohol, a gamma amino alcohol, and an ortho amino phenol, said ester having a 5-9 pH in an aqueous solution.

9. A water soluble alkyl titanium ester of an amino hydroxy compound selected from the group consisting of a beta amino alcohol, a gamma amino alcohol, and an ortho amino phenol.

10. A chelated, water-stable alkyl titanium ester of triethanolamine.

11. A process for producing a water soluble amino ester of a metal from group IV-A of the periodic table which comprises reacting an organic ester selected from the group consisting of ortho and condensed ortho esters of said metal, said ortho ester corresponding to the formula $Me(OR)_4$ wherein Me consists of said metal and R is an organic radical selected from the group consisting of alkyl, cycloalkyl, aryl, and aralkyl, with an amino hydroxy compound selected from the group consisting of a beta amino alcohol, a gamma amino alcohol, and an ortho amino phenol, and recovering the resulting amino ester from the reaction products.

12. A process for producing a water soluble titanium ester of an amino hydroxy compound which comprises reacting an alkyl titanium ester having the formula $Ti(OR)_4$ in which R is an alkyl hydrocarbon radical of an alcohol containing from 1-12 carbon atoms with an amino hydroxy compound selected from the group consisting of a beta amino alcohol, a gamma amino alcohol, and an ortho amino phenol, and recovering the resulting amino ester from the reaction products.

13. A process for producing a water soluble zirconium ester of an amino hydroxy compound which comprises reacting an alkyl zirconium ester having the formula $Zr(OR)_4$ in which R is an alkyl hydrocarbon radical of an alcohol containing from 1-12 carbon atoms with an amino hydroxy compound selected from the group consisting of a beta amino alcohol, a gamma amino alcohol, and an ortho amino phenol, and recovering the resulting amino ester from the reaction products.

14. A process for producing a water soluble amino ester of a metal from group IV-A of the periodic table which comprises reacting an organic ester selected from the group consisting of ortho and condensed ortho esters of said metal, said ortho ester corresponding to the formula $Me(OR)_4$ wherein Me consists of said metal and R is an organic radical selected from the group consisting of alkyl, cycloalkyl, aryl, and aralkyl with an amino hydroxy compound selected from the group consisting of a beta amino alcohol, a gamma amino alcohol, and an ortho amino phenol, removing the volatile reaction by-product by subjecting the reaction mass to a distillation and recovering the resulting amino ester product.

15. A method for producing a water soluble amino ester of a metal from group IV-A of the periodic table which comprises reacting an organic ester selected from the group consisting of ortho and condensed ortho esters of said metal, said ortho ester corresponding to the formula $Me(OR)_4$ wherein Me consists of said metal and R is an organic radical selected from the group consisting of alkyl, cycloalkyl, aryl, and aralkyl with an amino hydroxy compound selected from the group consisting of a beta amino alcohol, a gamma amino alcohol, and an ortho amino phenol, recovering the resulting chelated metal ester reaction product, and adjusting the pH value by means of an acid so that an aqueous solution of the product is within a range of from about 5-9.

16. A process for producing a chelated, water-stable titanium ester which comprises reacting tetraisopropyl titanate with triethanolamine, removing isopropyl alcohol by-product from the reaction mass, and recovering the resulting ester product.

17. A process for producing a water soluble amino ester of a metal from group IV-A of the periodic table which comprises reacting an organic ester selected from the group consisting of ortho and condensed ortho esters of said metal, said ortho ester corresponding to the formula $Me(OR)_4$ wherein Me consists of said metal and R is an organic radical selected from the group consisting of alkyl, cycloalkyl, aryl, and aralkyl with an amino hydroxy compound selected from the group consisting of a beta amino alcohol, a gamma amino alcohol, and an ortho amino phenol.

18. A process for producing a titanium ester which comprises reacting tetraisopropyl titanate with triethanolamine and obtaining the resulting ester product.

19. A water soluble ester of an aminoalcohol and titanium, said ester being the reaction product of an alkyl titanate and an aminoalcohol of the group consisting of diethanolamine and triethanolamine.

20. A chelated, water-stable alkyl titanium ester of diethanolamine.

References Cited in the file of this patent

UNITED STATES PATENTS

| | | |
|---|---|---|
| 2,258,718 | Rothrock | Oct. 14, 1941 |
| 2,579,414 | Boyd | Dec. 18, 1951 |

OTHER REFERENCES

Di Giorgio et al.: J. Am. Chem. Soc., vol 71, pages 3254-3256, September 1949.

Wardlaw et al.: Nature, vol. 165, pages 75-76, January 1950.